(12) United States Patent
Goninan

(10) Patent No.: US 8,622,225 B2
(45) Date of Patent: Jan. 7, 2014

(54) FLUID PURIFICATION USING HYDRAULIC VORTEX SYSTEM

(76) Inventor: Brien Edward Goninan, Wilberforce (AU)

( * ) Notice: Subject to any disclaimer, the term of this patent is extended or adjusted under 35 U.S.C. 154(b) by 805 days.

(21) Appl. No.: 12/675,398

(22) PCT Filed: May 2, 2007

(86) PCT No.: PCT/AU2007/000565
§ 371 (c)(1),
(2), (4) Date: Feb. 25, 2010

(87) PCT Pub. No.: WO2007/128036
PCT Pub. Date: Nov. 15, 2007

(65) Prior Publication Data
US 2010/0237008 A1    Sep. 23, 2010

(30) Foreign Application Priority Data
May 2, 2006    (AU) ................................ 2006902278

(51) Int. Cl.
C02F 1/38        (2006.01)
B04C 3/00        (2006.01)

(52) U.S. Cl.
USPC ........ 210/512.1; 210/787; 210/788; 209/725; 209/727

(58) Field of Classification Search
USPC ................ 210/512.1, 787, 788; 209/725, 727
See application file for complete search history.

(56) References Cited

U.S. PATENT DOCUMENTS

| 3,768,658 | A | * | 10/1973 | Palma ........................ 210/512.1 |
| 3,893,914 | A | | 7/1975 | Bobo |
| 4,816,156 | A | * | 3/1989 | Brombach et al. ......... 210/512.1 |
| 5,714,068 | A | | 2/1998 | Brown |
| 6,569,323 | B1 | * | 5/2003 | Pribytkov .................. 210/512.1 |
| 6,576,029 | B2 | | 6/2003 | West |
| 6,811,690 | B2 | * | 11/2004 | Arnaud ...................... 210/512.1 |
| 6,997,328 | B2 | | 2/2006 | Wilcher et al. |
| 7,001,448 | B1 | | 2/2006 | West |
| 7,001,527 | B2 | | 2/2006 | Stever et al. |

FOREIGN PATENT DOCUMENTS

| EP | 1125620 A2 | 8/2001 |
| JP | 4180858 | 6/1992 |
| SU | 1079302 A1 | 3/1984 |
| WO | WO-8402855 | 8/1984 |
| WO | WO-9525584 | 9/1995 |

OTHER PUBLICATIONS

International Search Report for PCT/AU2007/000565 dated Jul. 20, 2007.
Written Opinion for PCT/AU2007/000565 dated Jul. 20, 2007.

* cited by examiner

*Primary Examiner* — David A Reifsnyder
(74) *Attorney, Agent, or Firm* — Peter K. Sollins; Foley Hoag LLP

(57) ABSTRACT

An assembly for water purification comprising a series of vessels which allows fluid to communicate therebetween via fluid supply lines. The assembly is arranged so as to generate a plurality of co operating vortices generated by fluid impact on formations disposed on an inner surface of the vessels to cause an ascending fluid flow to be deflected back in the direction of fluid flow thereby creating local vortices. Water exiting said vessels has higher purity than water entering the vessel.

25 Claims, 5 Drawing Sheets

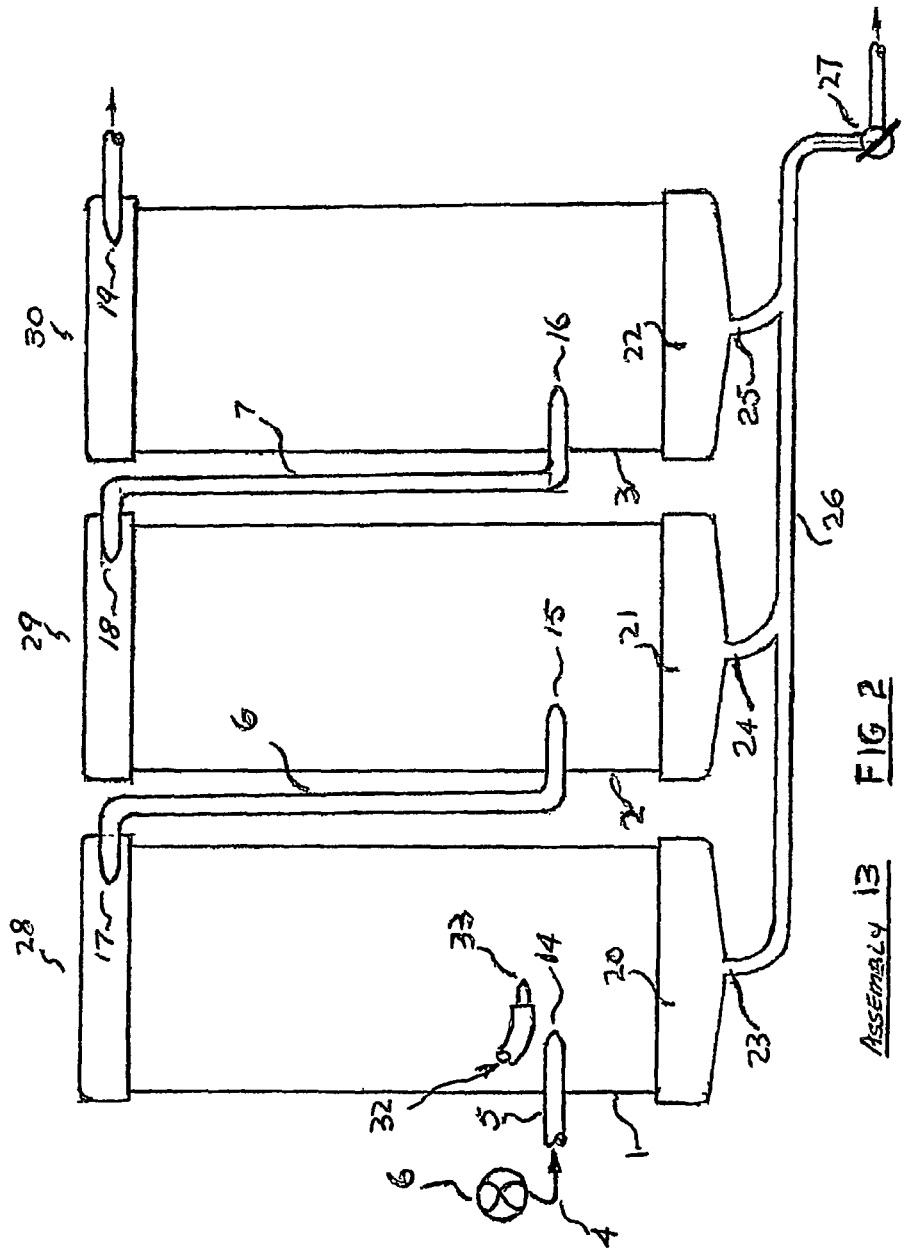

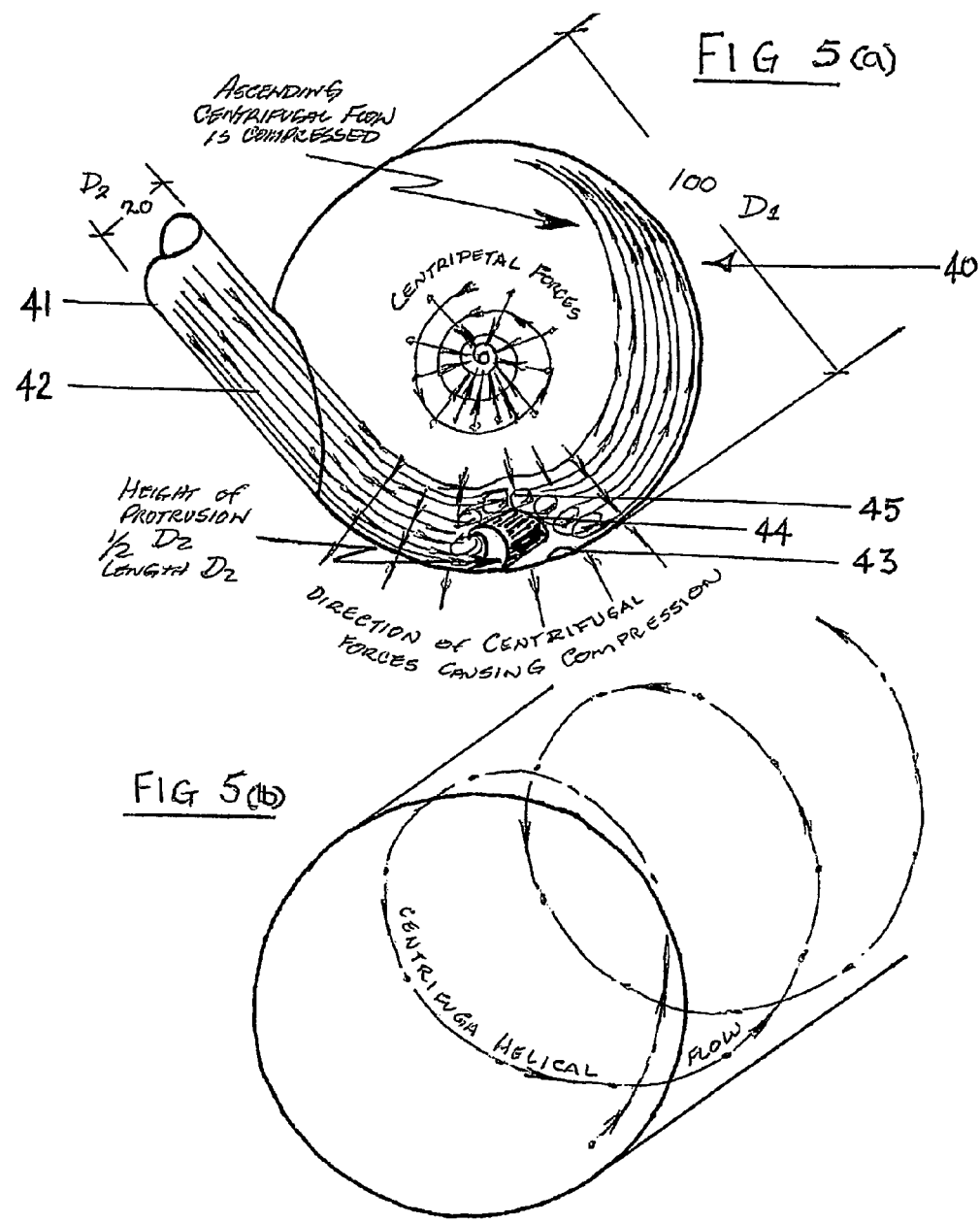

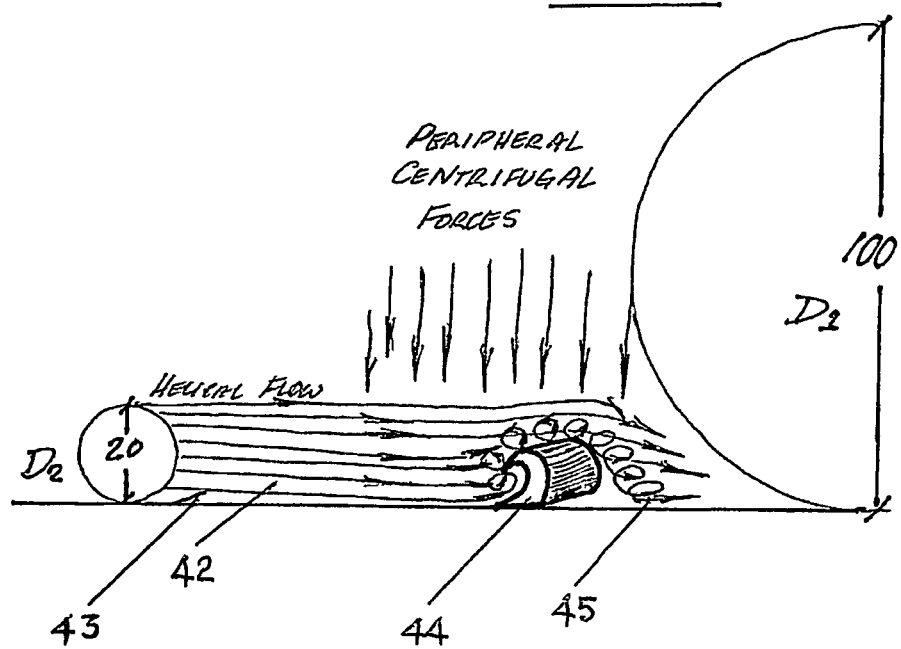

FLUID PURIFICATION USING HYDRAULIC VORTEX SYSTEM

CROSS-REFERENCE TO REALTED APPLICATION

This is the National Stage of International application Ser. No. PCT/AU2007/000565, filed May 2, 2007.

The present invention relates to improvements in the efficiency of pre-treatments for fluids and more particularly relates to hydraulic vortex systems for treating contaminated fluids such as but not limited to water. The present invention also relates to vortex systems for pre treating sea water for desalination, softening of brackish water, and purification of fluids generally. The invention further provides an apparatus for such pre treatments.

PRIOR ART

There are in existence a wide variety of decontamination processes particularly in water treatment. These take many forms and may be used in the food industry, in sewerage treatment and in desalination.

At present desalination systems rely on expensive processes including such processes as reverse osmosis and those using chemicals. In reverse osmosis, filter elements are used and chemicals must be used to pre-treat feed water to address problems of fouling and calcium compounds coating the reverse osmosis membranes that separate the fresh water from sea water.

Vortex systems have also been used to remove contaminants from fluids and more particularly to separate a substance of greater density/weight from the carrier fluid.

One example of a vortex system is disclosed in U.S. Pat. No. 7,001,448 which teaches a system employing a vortex finder tube for separating a liquid component from a gas stream. The system for separating an entrained liquid component from a gas stream employs at least one vortex tube having a liquid outlet end and a wet gas inlet tangential to its sidewall and arranged so that wet gas rotates within the vortex tube to cause the liquid components to be forced against the interior wall surface by centrifugal action. An orifice plate closes the vortex tube first end and has a concentric gas outlet opening therein. A vortex finder tube extends concentrically within the vortex tube providing an annular area between itself and the vortex tube internal wall. A gas deflector is positioned within the annular area and has a downwardly spiralled surface that diverts wet gas downwardly away from the wet gas inlet. In one embodiment, an outlet tube is affixed to the orifice plate central opening and is configured to divert outlet gas downwardly.

In another example U.S. Pat. No. 6,576,029 also discloses a system for separating an entrained liquid component from a gas stream.

In another example of a system for separation of fluids, U.S. Pat. No. 5,714,068 discloses an inlet device for large oil field separator. The device has an inlet momentum absorber for passing an oil/water/gas mixture into a separator vessel having an inlet nozzle that extends through the vessel wall into the interior thereof, and a nozzle axis. A dish-shaped deflector is supported within the vessel adjacent the deflector being intersected by the nozzle axis. A plurality of closely spaced apart cylindrical posts are arranged in an enlarged circumferential pattern defining a dispersing area within the vessel, the dispersing area is formed equilaterally around the nozzle axis. The closely spaced cylindrical posts provide a multitude of tortuous paths through which the oil/water/gas mixture flows from the dispersing area into the interior of the vessel.

Another mechanical separation system is disclosed in U.S. Pat. No. 6,997,328 which discloses a grit removal assembly for removing grit from a fluid comprising a tank with a fluid inlet into the tank and a discharge from the tank. A flow directing assembly is positioned in the tank adjacent the fluid inlet and includes a substantially U-shaped surface opposite the fluid inlet such that fluid entering the tank through the inlet is caused to have a reversed flow in a direction more than 90 degrees from an inlet flow direction. At least one embodiment of the assembly further comprises a baffle positioned proximate the tank discharge to control flow adjacent the discharge. Yet a further embodiment of the assembly includes a screw conveyor positioned in a trough of the tank and a baffle is positioned proximate the trough to minimize fluid flow velocity adjacent to the screw conveyor.

In another examples of a water treatment apparatus U.S. Pat. No. 7,001,527 discloses a stormwater treatment apparatus and method. The patent teaches a liquid purification and separation apparatus for separation of pollutants in stormwater runoff is disclosed. This apparatus utilizes gravitational separation and tortuosity, resulting from a plurality of baffles both perpendicular to and oblique to the primary water flow direction, to trap substances less-dense and more-dense than water. The apparatus features improved resistance to pollutant remobilization through treatment of water volume rather than flow rates, using vertically stacked water columns of varying depths to settle small particles. An overflow structure diverts excessive liquid without interfering with purification and separation, and can be placed integrally within or external to the apparatus receptacle.

There are disclosed in the prior art methods and apparatuses for sequentially separating a medium into different components such as that disclosed in WO 84/02855 (PCT/FI84/00005). A vessel for separating flowing media is disclosed in WO 95/25584. The vessel is used for mixing flowing media or extracting heavy constituents from flowing media which is characterised by the presence of means for generating a natural vortex in the media flowing into the vessel. The invention disclosed in that patent specification is characterised in that the cross section of the vessel has at least one abrupt increase in size within the vessel within the region of the generated vortex.

From the aforesaid description it can be seen that there are a wide variety of separation systems which include those employing vortices to generate flow of a fluid and to enhance separation for decontamination and other purposes.

INVENTION

The present invention provides an alternative to the known devices, apparatuses, processes and systems which use and generate vortices to perform a separation and for purification processes on a fluid stream.

The present invention provides a method and apparatus generally for liquid purification and separation and, more specifically, to an apparatus for separation of pollutants from contaminated waters such as but not limited to a water stream of sea water or a cooling tower water stream. According to the apparatus aspect of the invention, there is provided a vessel which includes a plurality of formations placed in the path of a water stream to contribute to the separation of fluid components (such as but not limited to contaminants) using formations such as but not limited to baffles provided at an angle to a water flow stream such as perpendicular to and/or oblique to the primary water flow direction, to generate vortices in the water stream to enable separation of contaminants. This invention is differentiated from prior art by improved resistance to and reduction in pollutant remobilization.

In addition, the invention provides improved decontamination through control of velocity of a water stream and with efficiency that exceeds that provided by existing gravitational, sub-surface, stormwater treatment systems.

According to the invention vortices are created in a fluid stream introduced into one or more vessels disposed in series each capable of decontamination in its own right. The vortices are created by interaction between water introduced into the vessel at a predetermined velocity, in a predetermined attitude and at least one formation in a wall of the one or more vessels. The introduced fluids in which a vortex is introduced in and prior to introduction into the vessels, which are preferably cylindrical, are dramatically spiralled and aerated causing increased cavitation and dissociation while producing a highly hostile environment for bacteria and micro organisms in the fluid's vortices.

The invention allows the reuse of effluent water, by treatment of such effluent in the process of the present invention. The invention has valuable applications to the pre-treatment of sea water or brackish water dramatically reducing the energy required for conventional desalination methods such as reverse osmosis so that the cost of desalination becomes more economical. The invention may also be used to eliminate hardness and heavy metals in bore water and particulates in stock water and irrigation. The invention further provides means to eliminate or substantially reduce chemical pollution of water reticulating systems and water recovery programs. The invention employs vortices to obtain more efficient elimination of pathogens; particulates; and various polluting substances in comparison to known system which employ vortices.

In its broadest form the present invention comprises:
an apparatus for the purification treatment of a water stream; the apparatus comprising;
a vessel having a wall defining an internal space, an inlet for introducing a fluid stream into the vessel in a predetermined attitude and at a flow rate which induces a primary vortex spiral in the fluid in the vessel,
an internal surface of the wall comprising at least one formation which interacts with the fluid stream to induce at least one auxiliary spiral;
said primary and at least one auxiliary spirals co operating to induce at least a partial separation of contaminants from said water stream so that water exiting said vessel has higher purity than the water entering said vessel.

According to one embodiment there are a series of like apparatuses each subjecting water from the water stream to vortex purification. In another embodiment, the water introduced into each vessel is induced into a vortex spiral (tertiary vortex) prior to entry into the vessel. This enhances the advantages from the vortex effect Preferably, the fluid stream is introduced into the inlet of each vessel in a direction and at a flow rate which induces the primary vortex spiral so that geometry of the formations co operates with the water stream to induce the auxiliary vortex spiral. The apparatus is ideally suited to vertical vortices as it utilises gravity to assist the precipitation of particulates to a sump in a base of each vessel. The sump is created by placing the inlet port at a predetermined distance above the base. Preferably the fluid is introduced in an upward and tangential direction. Since the fluid enters tangentially at or near the base of the vessel, the helical spiral upward flow of the fluid must rise to an outlet placed at or near the top of the vessel. The higher the inlet port the deeper the sump and the less motion in the relative 'calm' is observed, with particulates collected as they gravitate to the bottom of the sump.

In another broad form the present invention comprises:
An assembly comprising a series of vessels which allows fluid to communicate therebetween via fluid supply lines, the assembly arranged so as to generate a compound multiplication of vortices generated by fluid impact on formations disposed on an inner surface of the vessels to cause an ascending fluid flow, to be deflected back in the direction of fluid flow thereby creating local vortices.

Preferably, the formations each have a similar horizontal curved face positioned normal to the line of flow, causing the developed mini vortices to be compounded by each downstream formation as the fluid ascends up the inner wall 1 of the vessel towards an outlet.

According to a preferred embodiment, fluid deflection and consequent generation of mini vortices is enhanced by tangential input positioned above a fluid inlet port, of compressed air to be applied flowing in the same direction as the introduced fluid.

In another broad form according to a system aspect the invention comprises:
a system for purification of contaminated water comprising an apparatus including a plurality of vessels, each said vessels having a top, a bottom and a wall defining an internal space, an inlet which delivers a water stream into said vessel from a water source and an outlet; means to deliver said water stream into said vessel at a predetermined flow rate; the vessel having an internal contour which induces a primary vortex spiral in the water stream; the vessel including at least one formation which interacts with the fluid stream to induce at least one auxiliary hydraulic spiral; said primary and at least one auxiliary hydraulic spirals co operating to induce at least a partial separation of contaminants from said water stream so that water exiting each of said plurality of vessels via said outlet has higher purity than the water entering each said vessels.

As a result of the operation of the above assembly, greater precipitation of larger particulates for lower velocities, and elimination of other substances that cavitate at higher velocities, can occur with staged increases in velocity of fluid pumped into additional separate stages. Stages may be arranged so that there are three or more vortex cylinders arranged in the series.

A sump is provided in each vessel with the depth of the sump variable to suit fluids with particulates of various mass precipitating so that they can be readily discharged from vessel outlets.

BRIEF DESCRIPTION OF DRAWINGS

The present invention will now be described in more detail according to preferred but non limiting embodiments and with reference the accompanying illustrations wherein:

FIG. 2 shows an elevation view of an assembly comprising a series of vortex generating apparatuses;

FIG. 5a shows a sectional view through a vessel showing a schematic illustration of the force distributions according to one embodiment.

FIG. 5b shows a schematic illustration of the helical flow of fluid as it passes through a typical vessel as shown in FIG. 1.

FIG. 6 shows a schematic view through part of a wall formation of a vessel showing an illustration of the force distributions against the formation according to one embodiment.

DETAILED DESCRIPTION

The invention will be described with reference to an individual assembly and to a series assembly created from a set of vessels in series.

Figure 1:
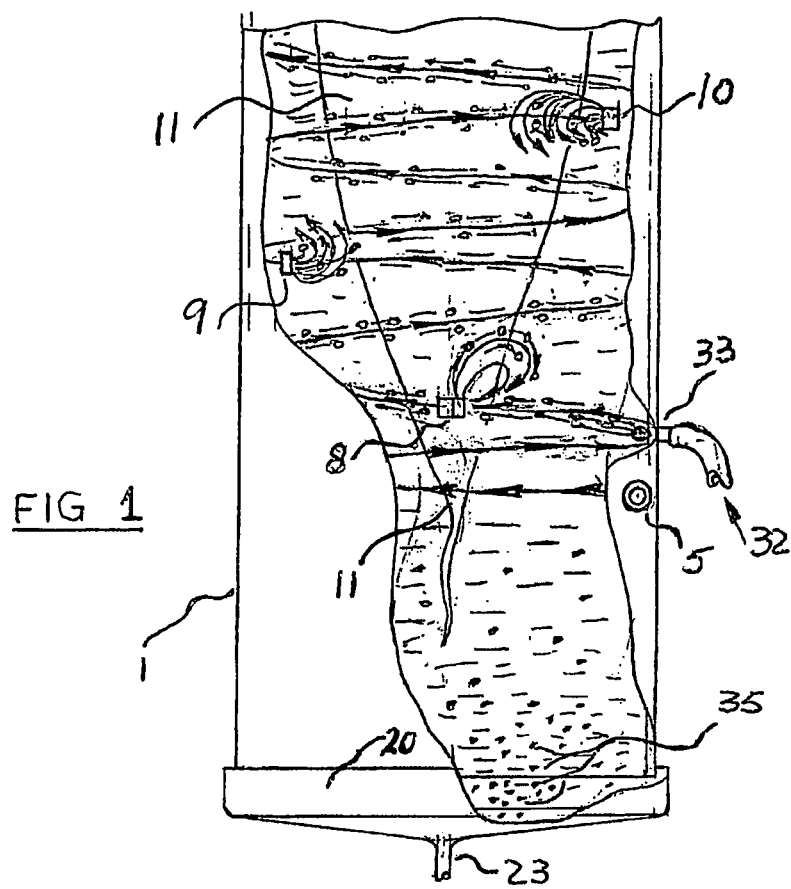
FIG. 1 shows a cutaway elevation view of an assembly comprising a vortex generating vessel.
Figure 3:
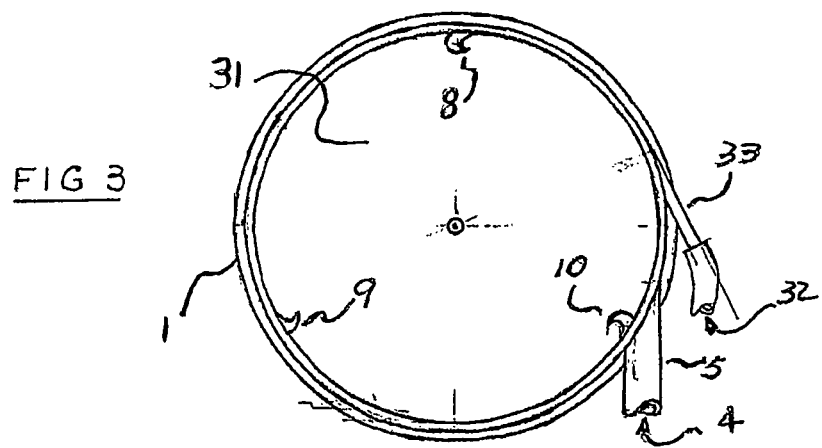
FIG. 3 shows a sectional view through the vessel of FIG. 1

FIG. 1 shows an elevation cut away view of an assembly comprising a vortex generating vessel 1. This is a fundamental form of the invention and it will be appreciated that the invention can be configured as a series of like vessels (see FIG. 2) which decontaminate a fluid introduced into the vessels. The additional vessels either decontaminate the fluid separately or cumulatively. As shown in FIG. 3, vessel 1 has internal space 31 in which a fluid 4 is introduced via an inlet 5. Fluid 4 is introduced via inlet 5 under the action of a pump 6 (see FIG. 2). Fluid 4 may be accelerated into inlet 5 by means of a mechanical spiral (see FIG. 4) which accelerates the fluid 4 rotationally. This induces a vortex upon entry into the vessel 1. When a fluid stream 4 is introduced into the vessel, the fluid impacts on formations 8, 9, and 10 (see FIG. 3) whose geometry induces local vortices into the fluid 4. The local vortices accumulate with the entry vortex creating a plurality of cumulative vortices. In addition, a further vortex spiral 11 is induced into the vessel travelling longitudinally along the vessel. Thus, there are three vortex creation phases between the inlet 5 and an outlet 17 at or near the top of the vessel 1.

Curved surfaces of formations 8, 9, and 10 are aligned preferably normally to the flow of the fluid, (as shown in FIG. 3), causing impacting fluid it to be deflected back towards the direction of flow of the fluid. In line with the progressive centrifugal flow of the fluid, the similarly aligned formations cause the progressing vortices to accumulate and are multiplied as they impact on successive formations. The local vortices are enhanced by a primary vortex 11 as shown in FIG. 1. Also from FIG. 1 the ascending vortex 11 defines a substantially conical funnel which is more pronounced as fluid velocity increases and expands in diameter towards the top of the vessel 1.

FIG. 2 shows an elevation view of an assembly 13 comprising a series of vortex generating apparatuses/vessels 1, 2 and 3. Assembly 13 comprises a feed pipe 5 which feeds vessel 1.

Vessels 2 and 3 are fed by outlet pipes 15 and 16 respectively. Each of vessels 1 and 2 respectively include outlet pipes 6 and 7 via exit ports 17 and 18. Vessel 3 exits from port 19. Each of vessels 1, 2 and 3 function in a similar manner to that described with respect to the vessel 1 of FIG. 1 in that two or three vortices are induced in each vessel.

The link pipes which communicate between, primary apparatus 1 and last stage apparatus 3, are preferably flexible hoses. This avoids the use of elbows which change direction of flow and induce flow losses. Flexible hoses maintain minimum resistance to fluid flow. The arrangement described in FIG. 2 is a multiple stage vortex assembly where vortex vessels are connected in series. The vessels with the obstacles causing the compounding vortices in the introduced fluid, may be alternated with cylinders with plain walls to allow for dissociated particulates to precipitate. The inlet to the vessels are set at a suitable height above the base, creating a sump because the direction of flow is upwards to the outlet at the top of the vessel. The resulting volume of fluid in the sump at the base of each vessel is free of the turbulence of the ascending vortices allowing particulates 35 (see FIG. 1) that precipitate to be removed through a draw off drains 23, 24 and 25 positioned at the centre of an end cap at the base of the vessel. The effect of alternating vessels provides for effective filtering; revitalising of irrigation water; grey water reclamation; and pre-treatment of sea water being desalinated.

FIG. 2 shows just one example of a three stage vortex system with the cylinders apparatuses 1, 2 and 3 arranged in series with the pipe 6 connecting the exit 17 of the first stage 1 to the inlet 15 of the second stage from which the outlet 18 is piped to the inlet 7 of the third stage. Fluid is pumped through the series system by pump 6. Inlet 14 is fed with fluid from pump 6 to the first stage 1. The inlet ports 14, 15 and 16 of each the respective three stages 1, 2 and 3 are set at an appropriate height above the bottom end caps 20, 24 and 25 in order to create a sump in each end cap which receives gravitating particulate substances settling from the fluid.

Stages 1, 2 and 3 of assembly 13 further comprises respectively tangential exits 17, 18 and 19 arranged so that the respective tangential entries 14, 15 and 16 allow for flow to be maintained in the same direction. The bottom end caps 20, 21 and 22 have outlets 23, 24 and 25 arranged in a manifold to a common pipe 26 to allow for periodic discharge of sediment through a control valve or faucet 27.

FIG. 3 shows a sectional view through the vessel of FIG. 1 with corresponding numbering for corresponding parts. FIG. 3 shows the vessel 1 with the top lid 28 removed.

As shown in FIG. 3, vessel 1 has internal space 31 in which a fluid 4 is introduced via an inlet 5. Fluid 4 may be accelerated into inlet 5 by means of a mechanical spiral (see FIG. 4) which accelerates the fluid 4 rotationally. This induces a vortex upon entry into the vessel. When a fluid stream 4 is introduced into the vessel, the fluid impacts on formations 8, 9 and 10 whose geometry induces local vortices into the fluid 4. The local vortices accumulate with the entry vortex creating a plurality of cumulative vortices as previously described in addition to vortex spiral 11 travelling longitudinally along the vessel. Curved surfaces of formations 8, 9 and 10 are aligned preferably normally to the flow of the fluid and are preferably disposed at 120 degree intervals, as shown in FIG. 3. This causes fluid impacting on formations 8, 9 and 10 to be deflected back towards the direction of flow of the fluid. The arrangement of the formations is one non limiting embodiment which optimally induces cumulative vortices but it will be appreciated by persons skilled in the art that variations in the positioning and vertical alignment of the formations so that the subsequent convolutions compound the increased vortices caused from the previous formations and compressed air 32 entering via port 33 are enhanced. In line with the progressive centrifugal flow of the fluid, the similarly aligned formations cause the progressing vortices to accumulate and are multiplied as they impact on successive formations.

Compressed air 32 enters the cylindrical vessel 1 through the tangential entry port 33 and induces turbulent flow while adding acceleration to the cumulative vortices. As the compressed air flows in the same direction as the flow of the fluid the air pressure magnifies the accumulating vortices generated by the formations.

Figure 4:
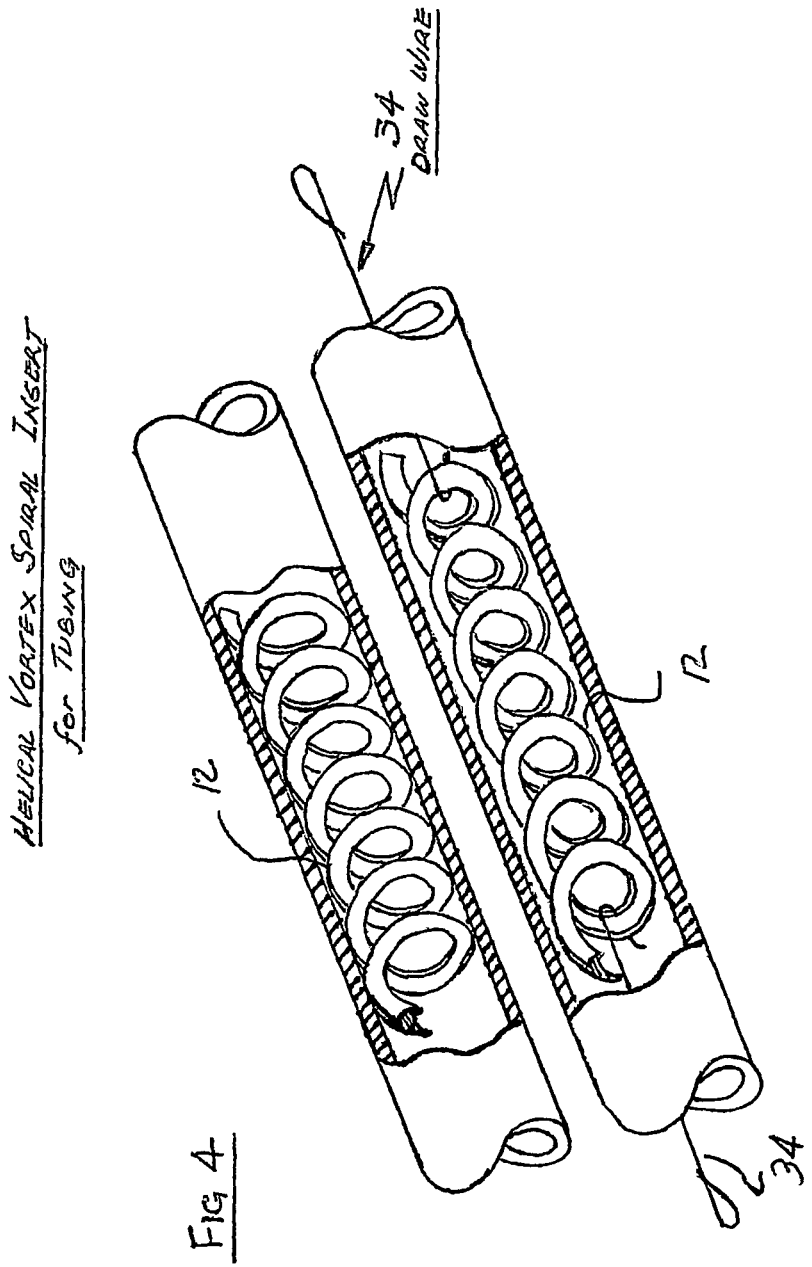
FIG. 4 shows a perspective view of a vortex inducing device which creates a tertiary vortex in a fluid prior to entry into the assembly of FIGS. 1 and 2.

FIG. 4 shows a perspective view of a vortex inducing device 12 (helical spiral insert) which is optionally introduced into such inlets 14, 15 and 16. Device 12 induces a tertiary vortex in a fluid prior to entry into the assembly of FIGS. 1 and 2. As shown in FIG. 4, device 12 comprises a helical spiral which may be introduced into an inlet line 5 shown partially abbreviated. The helical spiral may be introduced into connecting tubes by a draw line 34. The helical insert is preferably moulded and may have the same or similar geometry to the formations on the inner wall of the vessel except that the direction of flow is parallel to the longitudinal axis of the insert. Once fluid enters the vessels, flow impacts on the formations at an attitude which is preferably normal to a surface of the formations in the inner wall of the vessel. Impact on the formations induces a spiralling vortex flow throughout the entire multiple stage vortex system. A typical (non limiting) height or width of the moulded helical insert 12 section of FIG. 4 will be ⅛ or ⅙ of the internal diameter of the flexible hose in which it is placed, causing the flow water/fluid to be spiralled through the hose. The moulded helical insert 12, is preferably manufactured from a plastics such as nylon, and is preferably marginally oversized relative to the internal diameter of the tubing that is used to link the various stages, and the lead and return supply tubes. The nylon helical inserts are drawn into the tubes by a draw wire which reduces the diameter sufficiently to allow for proper positioning, so that when in place the insert 12 expands to hold itself in position by engagement with an inner wall of feed pipes. The moulded Vortex spiral 12 through flexible in line tubing avoids losses of velocity in the multiple stage systems, as the water/fluid is moved from one stage to another. It relies on the parabolic shape of the insert causing the water/fluid to spin through the tubing, and in so doing the velocity at the centre of the tube will increase as the molecules in the fluid spiral towards the centre with diminishing diameter as the fluid moves longitudinally along the tubing due to the pressure in the line. This feature for the connective tubing adds to the overall efficiency of the multiple vortex systems. The enhancement is twofold because by not using elbows it means the fluid is not driven into a right angle face to change direction, which happens repeatedly in multiple stage systems. Secondly, vortex spiralling velocities of fluids moving from one stage to another of a multiple vortex system, with the velocity actually increasing towards the centre, means that the Kinetic Energy of the particulates increases in proportion to the square of the velocity which increases as the flow diameter reduces. As the velocity accelerates the compression force from the Kinetic Energy in fact approaches infinity at the centre flow line of the fluid in the tube. This may be illustrated with reference to an example. The Kinetic Energy of particulates or clusters of molecules, may be illustrated taking a cylinder 100 mm [D] in diameter. With the constant mass being say [M] in the equation $KE=1/2M \times V \times V$. Considering the velocity has accelerated because the diameter of the vortex approaching the centripetal centre being say 1 mm and with constant pressure in the fluid, the velocity at the 1 mm [d] centre is 100 times that at the periphery of the cylinder wall since D/d is 100 to 1. For a velocity at the circumference being say 10 m/sec, it follows that the velocity at the centre is 100 msec, which when both are squared is an increase in the KE of a factor of 100 to 10,000, which taken to its extreme approaches infinity.

This feature also sustains the hostile environment for micro biology due to the increased centripetal pressure in the Vortex system. The illustration in FIG. 4 of the Helical Vortex insert shows the positioning and the method of inserting the helix inside an existing tube. As the spiral is extended the spring radius is reduced, and where the outside diameter of the spring moulded insert is greater than the inside diameter of the tube, the spring holds its position when the draw wire is removed.

FIG. 5*a* shows a sectional view through a vessel showing a schematic illustration of the force distributions according to one embodiment. Vessel 40 includes inlet 41 which provides water stream 42 to vessel 40. Water stream 42 is aimed tangentially to an inner surface 43 of vessel 40 at a predetermined flow rate determined by the relationship between velocity and cross sectional area of inlet 41. Water stream 42 impacts on formation 44 which creates local vortices 45 which contribute to forces reducing contaminants including dissolved solids and other contaminating elements such as but not limited to chlorine and chlorides.

FIG. 5*b* shows a schematic illustration of the helical flow of fluid as it passes through a typical vessel as shown in FIG. 1. FIG. 6 shows a schematic view through part of a wall formation of vessel 40 showing an illustration of the force distributions against the formation 44 according to one embodiment.

One application of the assembly of the present invention is to cause increased ionisation leading to cavitation of substances in reticulated water systems used in cooling towers. Because the invention causes substantial increase of cumulative vortices, producing myriads of mini vortices giving high levels of oxygen and hydrogen ions and their ionic compounds, pathogens are more completely destroyed in the fluid solution. The apparatus and methodology of the present invention, eliminates the continued use of the chemicals in water storage and re-use systems by councils and industry, that actually cause increase in slime and other toxicity. The general purification provided by the present invention to reticulated water does not require the addition of chemicals and hence overcomes a major source of pollution when the periodic dumping of the chemical concentrates in treated water occurs. Because chemicals are not used in the invention described herein, resultant chemical slime and algae which would otherwise form, does not form. Hence the exposed build up of calcium carbonates in the coagulated form of Calcite are reduced to the micronised state of Aragonite through cavitation, allowing for removal.

The invention adapts two main functions to substantially increase the efficiency of vortex systems. Firstly the assembly is arranged to cause an accumulation of mini vortices which are enhanced due to moulded formations or obstacles [fixed to the inside cylinder walls], that are shaped to cause a spiralling vortex in the fluid to be spun backwards against the direction of rotation of the fluid at the circumference of the vortex cylinder. A typical shape of the protruding obstacles is similar to but not limited to conventional wave motion. A suitable width of the formations/obstacles is gauged from the diameter of the inlet tube, the vortex cylinder, and the height of the protrusion is effective at half the width of the obstacle.

There is a relationship between the diameter of each inlet pipe and the preferred size of the formations on which fluid flow impacts in the vessels. For example, for a 22 millimeter entry pipe the formation is 22 millimeters wide and 11 millimeters high, and 20 millimeters thick at the base. The formations are according to one embodiment, suitably positioned 120 degrees apart in a spiral manner spaced helically in the same direction as the progressive flow of the fluid vortex 11 in the vessel 1. The formations preferably have an internal curved surface geometry as shown in FIG. 3 opposing the direction of flow of the approaching fluid in order to deflect the fluid in the general direction from which the fluid is coming. This causes masses of vacuum bubbles which accumulate and multiply and compounded, increasing in proportion to the number of formations/obstacles used, and the velocity of the fluid when accelerated.

The primary vortex 11 is analogous to a spiralling hurricane wind causing increased vortex intensity. According to one embodiment, the vortices created by the fluid are assisted by compressed air pumped into the vortex vessels via a similar tangential entry as the fluid entry and at a suitable height above the fluid inlet port but lower than a level of the first encountered formation. The compressed air is introduced in the same direction of flow as the ascending fluid in which vortices are introduced. The combined effect of the vortices and compressed air in typical operation produces well defined vortex cones rising above the generated turbulence. The present invention provides an alternative to known devices and systems which rely on the use of moving impellers, to accelerate vortices.

Primary vortex 11 and sub vortices are related to design parameters having such variables as vessel design and height; fluid entry angle and diameter of entry tube; fluid pressure and velocity of entry; application of compressed air; design and positioning of peripheral internal formations. One application of the arrangements described above, is in water purification which occurs when the water to be treated is pumped, via tangential entry and exit ports into a multiple stage vortex system as described above, at suitable pressure and velocity into chambers with appropriate entry and exit parameters, with formations positioned to generate the sub vortices. Turbulence and momentum of water molecules generates opposing centripetal and centrifugal forces, acting in opposing radial directions. A zone is developed where water molecules are exposed to shear forces as water is drawn to the centre of the vortex opposing the pull to the periphery at the inner wall of the vessel/container.

Experiments have shown that a medium generated in the way described above is hostile to micro-organisms and causes dissociation of slime and scale in pumps and other equipment that require piped reticulated water for cooling such as air conditioning systems.

Another practical application is in aquaculture and fish tanks where the water is continually or spasmodically recycled through a multiple vortex system as disclosed. In this application fish are observed swimming in and out of the resulting turbulence coming from an outlet pipe as it enters below the surface of the water in the tank. Because of the water purifying benefits provided by a multiple vortex system, excreta from the fish and algae are eliminated, and the problems of fungi and micro organisms proliferating in the tank are significantly reduced or eliminated. This feature does not occur where the common practise of compressed air only is piped into the tank. The process is cost effective for softening sea water in a pre-treatment stage for desalination. The advantage of having the sea water pre softened results in significant reduction in power necessary to drive a desalination plant, which in turn provides carbon credits for reduction of power generated from fossil fuels needed to pressurise reverse osmosis chambers.

Revitalised water from vortex systems assembled in accordance with the invention have immediate application for enhancing live stock, agriculture and hydroponics; aqua culture; milk production from dairy cows; chemical free cooling tower water reticulation; council water re-use; drinking water; and domestic spa, bath and shower.

Water softening and revitalisation is amplified as the compound multiplication of mini vortices are developed in a multi staged set of vortexing cylinders connected in series. The mini vortices are compounded by centrifugal forces in the spiralling liquid as it is forced against formations 8, 9 and 10 arranged to deflect the fluid. According to one embodiment, where three vortexing cylinders are in series, such as shown in FIG. 2 the first cylinder contains the formations positioned in a line of the ascending helical motion of the fluid up the inner wall of the cylinder. This generates mini vortices repeatedly compounded with additional vortices. The process is further agitated with compressed air entering through the port 33 as described which accelerates the flow of the mini vortices. The series staging allows for water or fluids to have lower velocity vortices as a first stage to allow for precipitation of larger particulates where the fluid is rotating with slower motion. With higher velocities introduced to subsequent stages, finer particles result from dissociation. A subsequent stage without obstacles and compressed air being introduced, allows for greater formation of ionised compounds to polarise in the fluid with less turbulence.

During fluid treatment the assembly utilises the force of gravity to assist the precipitation of particulates to the sump formed by the inlet port being suitably positioned above the base of the cylinder. Because the fluid enters tangentially at the bottom end of the containment, the helical upward flow of the fluid must rise to the exit at the top. The higher the inlet port the deeper the sump and the less motion in the relative 'calm' is observed, with particulates collecting as they gravitate to the bottom of the sump.

A Data logger may be employed that will take and hold readings from sensors for various parameters including pH; temperature of vortex water; electrolyte level; velocity of water in the system. The pH and electrolyte values are significant for indicating control of rust and corrosion. The Data logger will store the necessary information that can be sent by email to monitors or mobile phones. This will allow compilation of performance date of the system over predetermined periods of operation.

Set out below in table 1 is a series of comparative results between a raw sample of sea water and results after treatment in a vessel assembly according to the invention.

TABLE 1

| | PH300075, EC100985, ECT00985, ECN00985, ECMOO98S, ORP00091, | | | | | |
|---|---|---|---|---|---|---|
| logA.txt | PH pH, | Conducty S/cm, | TEMP °C., | TDS S/cm, | Chlorine mg/L, | ORP mv, |
| Reference reading - static Fivedock water | | | | | | |
| 16/04/07, 14:39:00, Fivedock water sample (sea water). | 8.254, | 1600.4, | 20.11, | 1777.6, | 840.5, | −1.6, |
| 16/04/07, 15:01:00, | 7.751, | 618.7, | 23.48, | 638.9, | 309.9, | 28.5, |
| 16/04/07, 15:02:00, | 8.193, | 618.7, | 23.41, | 528.1, | 255.0, | 32.3, |
| 16/04/07, 15:03:00, | 8.224, | 406.3, | 21.57, | 437.1, | 210.2, | 36.4, |
| 16/04/07, 15:04:00, | 8.237, | 510.7, | 20.23, | 565.6, | 216.6, | 38.2, |
| 16/04/07, 15:05:00, | 8.235, | 510.7, | 21.01, | 442.4, | 212.9, | 38.9, |
| 16/04/07, 15:06:00, | 8.239, | 510.7, | 22.81, | 425.5, | 204.6, | 39.9, |
| 16/04/07, 15:07:00, | 8.240, | 510.7, | 20.16, | 566.5, | 216.9, | 40.6, |
| 16/04/07, 15:08:00, | 8.240, | 510.7, | 19.91, | 569.6, | 275.6, | 41.0, |

TABLE 1-continued

| logA.txt | PH pH, | Conducty S/cm, | TEMP °C., | TDS S/cm, | Chlorine mg/L, | ORP mv, |
|---|---|---|---|---|---|---|
| 16/04/07, 15:09:00, | 8.240, | 406.3, | 22.64, | 427.1, | 205.3, | 40.8, |
| 16/04/07, 15:10:00, | 8.241, | 510.7, | 21.92, | 545.1, | 263.5, | 40.8, |
| 16/04/07, 15:11:00, | 8.242, | 510.7, | 20.44, | 563.1, | 272.3, | 40.8, |
| 16/04/07, 15:12:00, | 8.242, | 510.7, | 21.73, | 547.4, | 264.6, | 40.4, |
| 16/04/07, 15:13:00, | 8.239, | 510.7, | 21.46, | 550.6, | 266.2, | 40.2, |
| 16/04/07, 15:14:00, | 8.239, | 510.7, | 20.04, | 568.0, | 274.7, | 39.7, |
| 16/04/07, 15:15:00, | 8.238, | 510.7, | 21.59, | 549.1, | 265.4, | 39.3, |
| 16/04/07, 15:16:00, | 8.239, | 510.7, | 22.32, | 540.5, | 261.2, | 39.1, |
| 16/04/07, 15:17:00, | 8.238, | 510.7, | 20.80, | 558.6, | 328.7, | 38.7, |
| 16/04/07, 15:18:00, increased to 80 PSi | 8.240, | 618.7, | 20.24, | 565.5, | 273.5, | 37.6, |
| 16/04/07, 15:19:00, | 8.240, | 618.7, | 19.87, | 690.8, | 275.8, | 38.4, |
| 16/04/07, 15:20:00, | 8.239, | 618.7, | 21.62, | 664.8, | 322.8, | 36.7, |
| 16/04/07, 15:21:00, Reduced to 50 PSI | 8.239, | 618.7, | 22.08, | 658.2, | 262.5, | 37.5, |
| 16/04/07, 15:22:00, | 8.240, | 510.7, | 21.02, | 555.9, | 268.8, | 36.9, |
| 16/04/07, 15:23:00, | 8.240, | 510.7, | 20.78, | 558.9, | 270.2, | 36.4, |
| 16/04/07, 15:24:00, | 8.241, | 618.7, | 21.18, | 671.2, | 325.9, | 36.0, |
| 16/04/07, 15:25:00, | 8.240, | 510.7, | 19.67, | 572.7, | 277.1, | 35.6, |
| 16/04/07, 15:26:00, | 8.240, | 510.7, | 20.22, | 565.8, | 273.6, | 35.4, |
| 16/04/07, 15:27:00, | 8.241, | 510.7, | 21.43, | 667.5, | 324.1, | 35.1, |
| 16/04/07, 15:28:00, | 8.241, | 618.7, | 20.29, | 684.4, | 332.5, | 34.7, |
| 16/04/07, 15:29:00, | 8.240, | 618.7, | 20.68, | 678.6, | 329.6, | 34.5, |
| 16/04/07, 15:30:00, | 8.240, | 618.7, | 20.27, | 684.7, | 332.6, | 34.3, |
| 16/04/07, 15:31:00, | 8.241, | 618.7, | 21.18, | 671.2, | 325.9, | 34.2, |
| 16/04/07, 15:32:00, | 8.241, | 618.7, | 21.57, | 665.6, | 323.1, | 33.8, |

The above table provides results of treatment of a sample of sea water after processing through the apparatus according to the invention. A number of (non exhaustive) observations may be made from the results. The pH remained largely unchanged from the control sample pH irrespective of the pressure at which the treated sample water was introduced into the treatment vessel. The water to be treated was first introduced into the vessel at a flow rate pressure of 60 psi. This was first increased to 80 psi and then decreased down to 50 psi. The conductivity of the solution irrespective or pressure remained within the range of 510.7 to 618.7. However, compared to the untested sample (measured prior to treatment) the conductivity of the treated sample irrespective of pressure of introduction of the water into the treatment vessel became less than half the measured conductivity of the untested control sample. The measured temperatures of both the sample and the treated water remained within the range of 19.67-23.48 demonstrating little variation between treated and untreated. In comparison to the untreated control sample the total dissolved solids in the treated samples were approximately 30% of the measured total dissolved solids of the untreated sample. Chloride levels in the treated sample were about 30% of the measured level of the pre treated sample. The levels did not vary markedly relative to the pressure of introduction of the water.

Set out below in table 1 is a series of comparative results between a raw sample of fresh water and results after treatment in a vessel assembly according to the invention.

TABLE 2

| log.txt | PH300075, EC100985, ECT00985, ECN00985, ECM00985, 0RP00091, | | | | | |
|---|---|---|---|---|---|---|
| Date time, | PH | conductivity | TEMP | TDS | chlorine | ORP |
| Reference | | | | | | |
| 05/03/07, 11:36:38, | 7.614, | 230.0, | 25.28, | 228.7, | 108.8, | 237.3, |
| 05/03/07, 11:38:00, 35 PSI - No Air | 7.625, | 230.4, | 25.10, | 230.0, | 109.4, | 239.0 |
| 05/03/07, 11:43:05, | 7.485, | 232.3, | 25.25, | 231.1, | 110.0, | 235.3, |
| 05/03/07, 11:44:00, | 7.518, | 227.8, | 25.32, | 226.4, | 107.7, | 212.7, |
| 05/03/07, 11:46:00, | 7.520, | 226.0, | 25.40, | 224.2, | 106.7, | 185.5, |
| 05/03/07, 11:48:00, | 7.515, | 225.6, | 25.19, | 224.7, | 106.8, | 168.3, |
| 05/03/07, 11:50:00, | 7.505, | 225.3, | 25.43, | 223.4, | 106.2, | 157.0, |
| 05/03/07, 11:51:17, | 7.497, | 225.3, | 25.54, | 222.9, | 106.0, | 150.3, |

TABLE 2-continued

| log.txt | PH300075, EC100985, ECT00985, ECN00985, ECM00985, 0RP00091, | | | | | |
|---|---|---|---|---|---|---|
| Date time, | PH | conductivity | TEMP | TDS | chlorine | ORP |
| 35 PSI - Air injected | | | | | | |
| 05/03/07, 11:52:00, | 7.499, | 88.4, | 25.29, | 87.7, | 41.3, | 149.0, |
| 05/03/07, 11:54:00, | 7.561, | 85.1, | 25.28, | 84.2, | 39.5, | 147.6, |
| 35 PS1 - Air Removed | | | | | | |
| 05/03/07, 11:56:00, | 7.555, | 225.1, | 25.36, | 223.5, | 106.3, | 149.0, |
| 05/03/07, 11:58:00, | 7.465, | 224.9, | 25.43, | 223.0, | 106.1, | 142.4, |
| 05/03/07, 12:00:00, | 7.448, | 224.9, | 25.22, | 224.0, | 106.5, | 134.8, |
| 60 PSI - No Air | | | | | | |
| 05/03/07, 12:01:06, | 7.440, | 225.1, | 25.30, | 223.7, | 106.4, | 130.0, |
| 05/03/07, 12:02:00, | 7.430, | 225.5, | 25.47, | 223.4, | 106.3, | 124.4, |
| 05/03/07, 12:04:00, | 7.419, | 225.8, | 25.43, | 223.9, | 106.6, | 117.9, |
| 05/03/07, 12:06:00, | 7.410, | 225.8, | 25.48, | 223.7, | 106.3, | 114.3, |
| 05/03/07, 12:08:00, | 7.403, | 226.0, | 25.43, | 224.0, | 106.5, | 111.6, |
| 60 PSI - Air Injected | | | | | | |
| 05/03/07, 12:10:00, | 7.409, | 157.5, | 25.60, | 155.0, | 73.3, | 108.0, |
| 05/03/07, 12:12:00, | 7.441, | 149.5, | 25.58, | 147.3, | 69.3, | 111.2, |
| 05/03/07, 12:14:00, | 7.434, | 167.7, | 25.63, | 156.3, | 72.5, | 111.2, |
| 05/03/07, 12:16:00, | 7.429, | 152.6, | 25.56, | 151.4, | 71.8, | 110.6, |
| 60 PSI - Air Removed | | | | | | |
| 05/03/07, 12:18:00, | 7.389, | 221.2, | 25.42, | 219.4, | 104.3, | 113.7, |
| 05/03/07, 12:20:00, | 7.382, | 221.2, | 25.55, | 218.8, | 104.0, | 108.2, |
| OS/03/07, 12:22:00, | 7.380, | 221.4, | 25.72, | 218.2, | 103.8, | 107.0, |
| 80 PSI - No Air | | | | | | |
| 05/03/07, 12:24:00, | 7.376, | 221.9, | 25.72, | 218.7, | 104.0, | 104.5, |
| 05/03/07, 12:26:00, | 7.376, | 222.3, | 25.75, | 218.9, | 104.0, | 102.1, |
| 05/03/07, 12:28:00, | 7.376, | 222.5, | 26.02, | 217.9, | 103.7, | 100.7, |
| 05/03/07, 12:30:00, | 7.375, | 222.7, | 25.97, | 218.3, | 103.8, | 100.4, |

The above table provides results of treatment of a sample of fresh tap water after processing through the apparatus according to the invention. A number of (non exhaustive) observations may be made from the results. The pH remained largely unchanged from the control sample pH irrespective of the pressure at which the treated sample water was introduced into the treatment vessel and irrespective of whether the introduced water was air pressure assisted. The water to be treated was first introduced into the vessel at a flow rate pressure of 30 psi with no air assistance. The conductivity of the treated sample did not vary significantly form the untreated sample. The conductivity of the solution irrespective or pressure remained within the range of 149.5-225.3. At 35 psi with no air assistance, there was insignificant change to the temperature measured, total dissolved solids or chloride in the treated sample compared to the untreated sample. At 35 psi and with air injection the conductivity dropped significantly along with a very significant drop in the parameters in the treated sample of conductivity (which suggests a reduction in electrolytes in solution), total dissolved solids and chloride and ORP. When the air injection was removed in this sample for the same pressure of water injection the parameter values reverted back to the no air injection values recorded for the first no air 35 psi test. At 60 psi with no air injection the values remained similar to those achieved for 35 psi and no air injection. At 60 psi and air injection there was a significant reduction in the parameters in the treated sample of conductivity (which suggests a reduction in electrolytes in solution), total dissolved solids and chloride and ORP. When the air injection was removed in this sample for the same pressure of water injection the parameter values reverted back to the no air injection values recorded for the first no air 60 psi test. At 80 psi with no air injection there was a further reduction in the measured parameters in the treated sample of conductivity (which suggests a reduction in electrolytes in solution), total dissolved solids and chloride and ORP. This suggests that purification is improved as entry pressure of the water stream to be purified is increased and may be further reduced with air injection.

This was first increased to 80 psi and then decreased down to 50 psi The measured temperatures of both the sample and the treated water remained within the range of 19.67-23.48 demonstrating little variation between treated and untreated. In comparison to the untreated control sample the total dissolved solids in the treated samples were approximately 30% of the measured total dissolved solids of the untreated sample. Chloride levels in the treated sample were about 30% of the measured level of the pre treated sample. The levels did not vary markedly relative to the pressure of introduction of the water.

It will be recognised by persons skilled in the art that numerous variations and modifications may be made to the invention as broadly described herein without departing from the overall spirit and scope of the invention.

The invention claimed is:

1. An apparatus for the purification treatment of a water stream, the apparatus comprising:
   a cylindrical vessel having a top, a bottom and a wall defining an internal space, an inlet at one end through which is delivered a water stream into said vessel from a water source and an outlet at an opposite end which discharges purified water from said water stream; and
   wherein the water source is capable of delivering said water stream into said vessel at a preselected flow rate;

wherein the water stream on entry into the vessel adopting a primary spiral flow pattern on an inner surface of the wall of the cylindrical vessel as it travels from the inlet to the outlet;

wherein the vessel includes a plurality of formations extending from the inner surface of the wall, each of the plurality of formations impeding the path of at least some of the water in the primary spiral water flow to induce at least one auxiliary hydraulic water spiral near each formation; and wherein said primary spiral water flow and at least one auxiliary hydraulic spiral cooperate to induce at least a partial separation of contaminants from said water stream so that water exiting said vessel via said outlet has higher purity than the water entering said vessel.

2. An apparatus according to claim 1 wherein the inlet to the vessel is located in the wall of the vessel.

3. An apparatus according to claim 2 wherein said water stream is delivered at a predetermined flow rate by a pump which interacts with water in an inlet delivery line.

4. An apparatus according to claim 3 wherein the inlet is located at or near the bottom of the vessel.

5. An apparatus according to claim 4 wherein the inlet is arranged to deliver water tangentially to the wall of the vessel on entry into the vessel.

6. An apparatus according to claim 5 wherein the inlet is inclined to deliver said water in an upward direction.

7. An apparatus according to claim 6 wherein the formations are integral with the wall of the vessel.

8. An apparatus according to claim 7 wherein said plurality of formations are spaced circumferentially on the inner surface of the wall of the vessel in a spiral pattern in the path of the primary water spiral.

9. An apparatus according to claim 8 wherein a first formation is located at a first elevation within said vessel and a plurality of formations are each located at separate but lower elevations.

10. An apparatus according to claim 9 wherein the plurality of formations are evenly spaced apart about said inner surface along the spiral path of the primary water spiral.

11. An apparatus according to claim 10 wherein the primary spiral water flow defines a gradual upward helix on the internal surface of the cylinder.

12. An apparatus according to claim 11 wherein one outlet is in communication with at least one other vessel capable of water purification treatment.

13. An apparatus according to claim 12 wherein the water comprising the stream is sea water.

14. An apparatus according to claim 13 wherein the purification treatment removes contaminants from the sea water.

15. An apparatus according to claim 14 wherein the vessel includes a reservoir which collects contaminants which gravitate from the water stream to the reservoir.

16. An apparatus according to claim 15 wherein the vessel further comprises a second outlet which discharges contaminants separated from the water stream.

17. An apparatus according to claim 16 wherein the inlet to the vessel has a diameter within the range 10-50 mm in diameter.

18. An apparatus according to claim 17 wherein the cylindrical vessel has a diameter within the range of 100 mm-1 meter.

19. An apparatus according to claim 18 wherein, said formations each have a height, measured from an inner surface of the vessel, which is approximately half the diameter of the inlet.

20. An apparatus according to claim 19 wherein the at least on formation has a width measured along a direction parallel to a longitudinal axis of the vessel which approximates the diameter of the inlet.

21. An apparatus according to claim 20 wherein each vessel is in communication with at least one other like vessel.

22. An apparatus according to claim 21 wherein the outlet of one vessel is in fluid communication with an inlet of an adjacent vessel.

23. An apparatus according to claim 22 wherein a second outlet in a bottom reservoir of each vessel is connected to a discharge line which removes waste products from each vessel.

24. An apparatus according to claim 23 wherein vessels are disposed in series and at the same relative height.

25. An apparatus according to claim 24 wherein the formations each have a curved face positioned normal to a direction of fluid flow, each generating said auxiliary vortices.

* * * * *